Feb. 16, 1960

E. WILDHABER 2,924,872

FORM-CUTTING TOOL

Filed June 18, 1956

INVENTOR:
Ernest Wildhaber

Feb. 16, 1960     E. WILDHABER     2,924,872
FORM-CUTTING TOOL

Filed June 18, 1956     2 Sheets-Sheet 2

INVENTOR:
Ernest Wildhaber

United States Patent Office 2,924,872
Patented Feb. 16, 1960

2,924,872

FORM-CUTTING TOOL

Ernest Wildhaber, Brighton, N.Y.

Application June 18, 1956, Serial No. 591,998

8 Claims. (Cl. 29—95)

The present invention relates to tools for form-cutting helical teeth, such as exist for instance on helical gears, herringbone gears and on helical worms, and to a method of making said tools.

Such tools cut in a helical path extending along and about the axis of the work piece. A multiplicity of tools may be used which are spaced about the axis of the work piece.

The tools referred to are relieved back of their side-cutting edges and end-cutting edges, and are sharpened by regrinding their cutting faces. After sharpening they are adjusted, to set the cutting edges back to their original distance from the axis of the work piece. This adjustment is in a constant direction radial of said axis, as regards the tool as a whole. But as a cutting tooth follows the helical tooth space it works in, this adjustment is not always truly radial with respect to the cutting face. It can be kept radial at the middle of the tool life. But in the earlier and later stages of the tool life the center of a cutting face will be adjusted along a line increasingly offset from the axis of the work piece with increasing distance of the cutting face from its position at mid-life. This change presents problems.

One object of the invention is to devise a form-cutting tool sharpened by regrinding its cutting face, that will cut a constant product during its whole life, and that has sufficient cutting clearance during its whole life, and is free from interference with the sides of the helical tooth spaces in which it cuts.

A further object is to devise a form-cutting tool of the said character, on which the cutting clearance does not vary during its life.

A still other aim is to devise a form-cutting tool sharpened by regrinding its cutting face, in which identical cutting edges are formed during all stages of its life by identical cutting faces, said cutting edges and cutting faces of different life stages being displaced relatively to each other about the axis of the helical cutting motion.

A further object is to devise novel tools for the form-cutting method and machine of my application Serial No. 538,399, filed October 4, 1955.

Another object is to devise a method of accurately producing such tools.

Other objects will appear in the course of the specification and in the recital of the appended claims.

Figure 1:
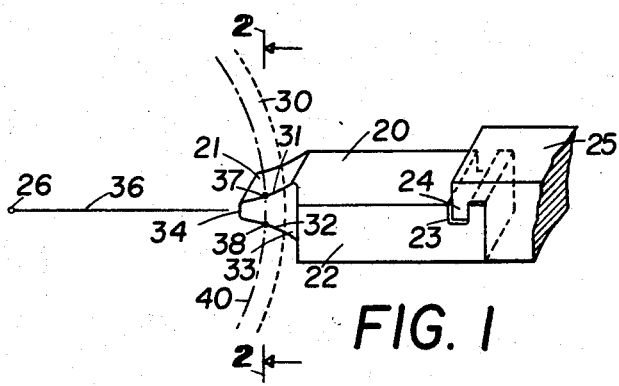
Fig. 1 is a view of a tool constructed according to the present invention, looking along the axis of a cylindrical work piece, that is along the axis of its relative helical cutting path.
Figure 2:
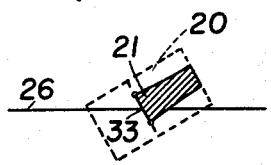
Fig. 2 is a section along lines 2—2 of Fig. 1, looking in the direction of the arrows.

Referring to Figures 1 and 2, the tool 20 contains a cutting portion or cutting tooth 21 and a shank portion 22. The latter contains a slot 23 engaged by a projection 24 of a holder 25, which controls the radial position of the tool 20. In the instance shown the slot 23 extends in the general direction of the relieved cutting tooth 21. The tool 20 and holder 25 are both guided for radial displacement towards and away from axis 26 of the cylindrical work piece 30 by guide means of known construction, not shown.

In operation helical cutting motion about the axis 26 of the work piece is effected between the cylindrical work piece 30 and tool 20. This motion may be a helical reciprocation performed either by the work piece or by the tool, or it may be split up between the tool and the work piece. For instance the work may turn on its axis while the tool reciprocates along said axis.

Slight modifications may be made for easing off the teeth at their ends.

At the end of a working stroke the tool and the work piece are moved apart sufficiently that they do not interfere with each other during the return stroke. At or just before the start of a working stroke the cutting position is restored.

In addition to these relative helical strokes a depth feed is ordinarily provided, until full depth is reached. A side surface of the teeth is then completely swept by a cutting edge in a single pass. Also the work piece may be indexed from time to time, if required.

A side-cutting edge 31 and an opposite side-cutting edge 32 are formed on the cutting portion 21 by a cutting face 33. The edges 31 and 32 are connected by an end-cutting edge 34. The surfaces back of the cutting edges are relieved, to provide cutting clearance.

Figures 1 and 2 show a cutting face 33 at a mean stage of the tool life. Here the cutting edges 31, 32 are symmetrical with respect to a radial line 36 contained in the plane of the cutting face. The depth feed may extend along this line. It may be performed by tool 20 and holder 25. Line 36 is also the direction of the tool adjustment radially of axis 26, required after sharpening.

Figure 3:
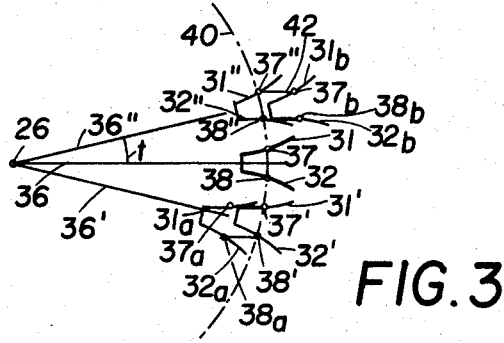
Fig. 3 is a diagram illustrative of the principles underlying the invention, and a view along the axis of the helical cutting path.

Diagram Fig. 3 shows the same side-cutting edges 31, 32 that correspond to the mid-life of the tool, mean points 37, 38 being marked thereon. They lie on a circle 40 which may be the pitch circle of the gear 30 to be cut.

At a later stage of the tool life the side-cutting edges will be identical with the edges 31, 32, but turned about the axis 26 of the work piece to cutting positions 31″, 32″. The center line 36″ is turned with respect to center line 36 through an angle $t$ shown exaggerated in the drawing. Positions 31″, 32″ are obtained by advancing the tool and its resharpened cutting edges a distance 42 parallel to radial line 36. Also, of course, the relative axial position is changed. Accordingly the tool profiles $31_b$, $32_b$ stand back of the cutting edges 31″, 32″ a distance 42.

At an earlier stage of the tool life the side-cutting edges will also be identical with the edges 31, 32, but turned about axis 26 to cutting positions 31', 32'. The center line 36' is turned with respect to center line 36 through an angle similar to $t$ in the opposite direction. Accordingly the tool profiles $31_a$, $32_a$ are displaced forwardly a similar distance 42.

The profiles 31', 32'; 31, 32; 31", 32" which coincide with the respective cutting edges lie on the helical tooth sides of the work piece 30. The corresponding profiles $31_a$, $32_a$; 31, 32; $31_b$, $32_b$ lie on the relieved surfaces of the tool.

The corresponding mean points 37", $37_b$ are at the same level, that is they have the same position lengthwise of axis 26. Likewise the points 38", $38_b$ are at the same level. This is also true of the points 37', $37_a$ and of the points 38', $38_a$.

Because such corresponding points are at the same level, the profile $32_b$ is seen to be closer to the helical tooth surface with profile 32" than profile $31_b$ is to the adjacent helical tooth surface with profile 31". The profile $32_b$ is clear of the adjacent tooth surface to a lesser degree than profile $31_b$, and may even interfere with it at its end. Likewise the profile $31_a$ has less distance from the adjacent helical tooth surface than profile $32_a$.

In accordance with the present invention the relief surfaces are modified by changing the position lengthwise of axis 26 of the profiles ($31_b$, $32_b$; $31_a$, $32_a$) on both sides of the central position, to achieve a balanced cutting clearance.

The helical tooth surface containing the identical profiles 32, 32" at two different levels contains other such identical profiles at other levels. These profiles are turned relatively to each other about axis 26. Those of a level higher than that of profile 32" are turned in clockwise direction with respect to profile 32" on the left hand gear shown, away from tool profile $32_b$. Thus by raising the profile $32_b$ along axis 26, without turning it, the tooth profile at the same raised level is turned away from it, and more clearance is achieved. The same raise applied to tool profile $31_b$ causes the adjacent tooth profile also to be turned in clockwise direction from profile 31", through the same angle. This is towards tool profile $31_b$, so that the excessive clearance on this side is reduced.

The tool profile $31_a$ at the opposite side of the central position needs to be raised to achieve more separation.

Figure 4:
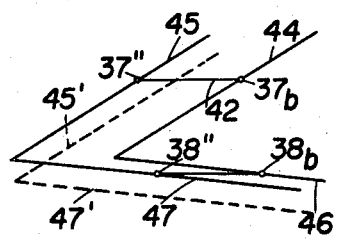
Figures 4 and 5 are diagrams further illustrating said principles with the tangents at the mean profile points.
Figure 5:
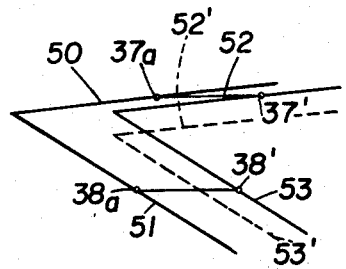

These conditions are further illustrated at a larger scale in Figures 4 and 5. Here the tangents at the mean profile points are shown rather than the profiles themselves. The tangent 44 (Fig. 4) at point $37_b$ of the tool profile is parallel to the tangent 45 at the corresponding point 37" of the tooth profile. Point $37_b$ is displaced a distance 42 from point 37" in a direction offset to one side of axis 26. Tangent 46 at point $38_b$ is parallel to tangent 47 at point 38". And point $38_b$ has the same distance 42 from point 38".

By raising the points $37_b$, $38_b$ and their tangents 44, 46 these points and their tangents are approached to the helical tooth side containing point 37" and withdrawn from the helical tooth side containing point 38". The tangent 45' of the helical tooth side corresponds to the new level of point $37_b$ and of tangent 44. It appears approximately parallel to tangent 45 at small or infinitesimal displacements. Likewise the tangent 47' of the helical tooth side corresponds to the new level of point $38_b$ and tangent 46. It is shown parallel to tangent 47. The two tangents 45' and 47' have about equal distances from the tangents 44 and 46 respectively, and indicate about equal clearance on both sides.

Fig. 5 refers similarly to the conditions at the points $37_a$, $38_a$. The tangents 50, 51 at these points have different distances from the tooth profile tangents 52, 53 at points 37', 38'. But again the distances can be equalized by raising the points $37_a$, $38_a$ and their profiles. 52', 53' then represent the corresponding tooth profile tangents at the same level.

The tool profiles are raised on both sides of the central position, increasingly with increasing distance from the central position. The axial displacement of the tool profiles is no longer directly proportional to their angular displacement about axis 26. It has a varying proportion thereto.

The change compensates for the fact that the tool adjustment at different life stages is at a varying inclination to the tool profiles which become cutting edges. At the middle, the inclination is the same on both profiles 31, 32; and their adjustment is radial of axis 26. On the sides the two profiles are differently inclined to the direction (36) of tool adjustment. And the adjustment of the center of the cutting face is in a direction bypassing axis 26 on one side or the other.

Figure 7:
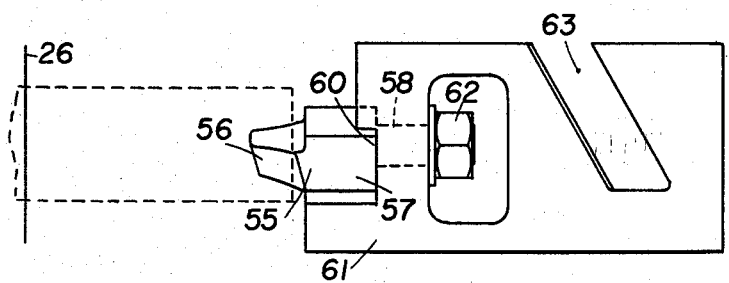
Fig. 7 is a side view of a modified tool construction.

A tool design modified as compared with Figures 1 and 2 is indicated in Fig. 7. The tool 55 has a cutting portion 56 and a square shank portion 57 terminating in a threaded stem 58. The square part of the shank portion seats in a slot 60 of a holder 61, and its stem 58 extends through a bore of said holder. It is rigidly secured thereto by a nut 62 threading on stem 58. The slot 60 is inclined in accordance with the helix angle of the teeth to be cut. The holder 61 is movable radially of axis 26 along guides not shown, and contains an inclined slot 63 for engagement with an axially moving actuating member. This construction is shown in detail in the aforesaid application. The cutting portion 56 and especially its relieved side surfaces are the same as on tool 20.

Analysis

Figure 8:
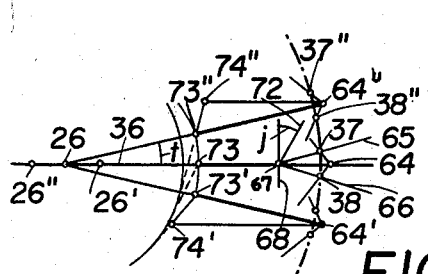
Fig. 8 is a diagram supporting the mathematical analysis of the shape to be produced, looking along the axis of the helical cutting path.
Figure 9:
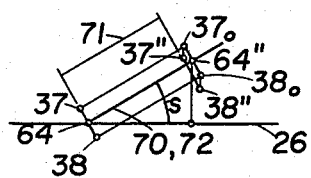
Fig. 9 is a diagrammatic side view corresponding to Fig. 8.

A more detailed analysis and description of the relieved side surfaces of the tools will now be made, and the preferred shape will be disclosed, referring to Fig. 8 and Fig. 9. Like Fig. 3, diagram Fig. 8 is a view taken in the direction of axis 26 of the helical cutting motion and of the work piece. Fig. 9 is a corresponding side view.

The first step will be to determine the tangent planes at the points 37, 38 of a cutting tooth. They are shown to be equally inclined to the tangent planes of the helical tooth surfaces cut, in this mean position.

Cutting faces shall first be considered which result in symmetrical cutting edges 31, 32. The tooth surface normals at the mean points 37, 38 intersect radial line 36 at a point 64 and constitute a plane. This plane may be embodied as the cutting face. Its inclination to the drawing plane of Fig. 8 is equal to the helix angle at point 64, as well known. The profile tangents 65, 66 at points 37, 38 lie in this plane and intersect at 67. The tangent planes of the helical tooth surfaces intersect in a straight line 68 that passes through point 67. Line 68 is inclined to the direction of axis 26 at the said helix angle at point 64.

The inclination of the tangent planes at points 37, 38 to the relieved side surfaces of the tool depends on the instantaneous relative motion only of a relieving tool. This motion is made up of a helical motion about axis 26, and of a relieving motion in the direction of radial line 36. We may consider infinitesimal displacements, as is common in mathematics. The helical motion then displaces the points 37, 38 merely in their tangent planes. Point 64 moves along helix tangent 70 (Fig. 9) an infinitesimal distance to 64". Points 37, 38 move to positions 37", 38". This displacement can be considered composed of a translation 64—64" together with point 64 to positions $37_0$, $38_0$, and of a turning motion through the angle of the helical motion. This turning motion is about an axis passing through 64". In any case the following relationships can be established, using the symbols $r$ = distance 26—64 (Fig. 8)
$a$ = distance of point 64 from a straight line drawn through the points 37, 38.
$s$ = helix angle at point 64, the helix angle being 90 deg.—lead angle
$t$ = turning angle about axis 26
$dt$ = infinitesimal part of $t$.
$i$ = angle included with the drawing plane of Fig. 9 by the intersection line of the tool tangent planes at points 37, 38.
$j$ = projected angle $i$, as it appears in the axial view of Fig. 8.

$$64\text{—}64'' \text{ of Fig. } 9 = \frac{rdt}{\sin s}$$

Distance 71 of Fig. 9 = distance of points 37'', 38'' from line $$37\text{—}38 = du = \frac{rdt}{\sin s} \cdot \left(1 - \frac{a}{r}\sin^2 s\right)$$

To these displacements due to the helical motion is now added a displacement $dx$ in the direction of radial line 36. The points 37'', 38'' thereby leave the tooth tangent planes. The sought tangent planes of the relieved surfaces are the planes connecting the new points with the profile tangents 65, 66 respectively.

These sought tangent planes intersect in a line 72 which in the projection of Fig. 9 seemingly coincides with the helix tangent 70. Line 72 is inclined to the drawing plane of Fig. 9 at an angle $i$ which represents the top-relief angle of the tool. It depends on the proportion of the relieved motion $dx$ to the turning motion $dt$ about axis 26, in the mid-life position considered, that is on $$\left(\frac{dx}{dt}\right)_o$$

the subscript being used to denote the middle position, where $t=0$.

With the above considerations it can be shown that angle $i$ can be computed with the following formula:

$$\tan i = \left(\frac{dx}{du}\right)_o = \left(\frac{dx}{dt}\right)_o \frac{\sin s}{\left(1 - \frac{a}{r}\sin^2 s\right)r} \quad (1)$$

Angle $i$ appears as an angle $j$ in a view along the axis 26 of the helical motion, Fig. 8. Tan $j$ can be shown to amount to $$\tan j = \frac{\tan i}{\sin s} = \frac{\left(\frac{dx}{dt}\right)_o}{\left(1 - \frac{a}{r}\sin^2 s\right)r} \quad (2)$$

In view of the equal inclinations of the profiles 31, 32 and of their tangents, the relief angles at points 37, 38 in planes at right angles to said tangents are equal. These relief angles are the ones that count. They may be called normal relief angles.

The final step of the analysis is to so determine the relief surfaces that this normal relief angle at the pair of opposite profile points remains the same at all stages of the tool life. In other words, the normal relief angle at points 37', 37'' and intermediate points should be the same as at point 37. It should be constant all along the working length of the relieved side surface. And the normal relief angle at points 38', 38'' and intermediate points should be the same as at point 38.

Consider the points 37'', 38'' which are turned about axis 26 through a finite angle $t$ with respect to the corresponding points 37, 38. A point or line (26) fixed to the tool has then moved from 26 to 26''. The relieving motion at points 37'', 38'' is parallel to radial line 36 and offset to one side from the axis 26 of the helical cutting motion. If the direction of the relieving motion were along radius 64''—26 and its rate were equal to the rate $$\left(\frac{dx}{dt}\right)_o$$

of the relieving motion at the central position, and then normal relief angles at points 37'', 38'' would be the same as at points 37, 38.

The relieving rate $$\left(\frac{dx}{dt}\right)_o$$

at the central position can be plotted as a distance 64–73 which also indicates its radial direction. A radial relieving rate 64''–73'' equal in amount to 64–73 thus would produce the desired normal relief angles at points 37'', 38''.

The same relief angles can be produced with a relieving motion parallel to radial line 36 by adding an axial motion to it. As can be demonstrated mathematically, the same desired tangent planes can be achieved by maintaining the end point 74'' of the vector defining the combined relieving and axial motion in the same plane parallel to the desired tangent plane as end point 73''. This is accomplished at both points 37'', 38'' when point 74'' lies on a line parallel to the intersection line of the tangent planes desired at these points. This line is inclined to the drawing plane of Fig. 8 and to the direction of axis 26. In a radial view along line 64''–73'' it appears inclined to axis 26 at the angle $s$, the mentioned helix angle at point 64.

In the position characterized by turning angle $t$, the relieving rate $$\left(\frac{dx}{dt}\right)$$

and the rate $$\left(\frac{dz}{dt}\right)$$

of the added axial motion can be determined from the shown projected triangle 64''—73''—74'', in which angle 73''—64''—74'' is equal to angle $t$; angle 64''—74''—73'' equals $(90°+j-t)$; and angle 64''—73''—74'' equals $(90°-j)$. 64''—73'' equals 64—73 and represents the relieving $$\left(\frac{dx}{dt}\right)_o$$

Accordingly $\left(\frac{dx}{dt}\right)$ = shown projection of 64''—74'', hence $$\left(\frac{dx}{dt}\right) = \left(\frac{dx}{dt}\right)_o \frac{\cos j}{\cos (j-t)} \quad (3)$$

$$\left(\frac{dz}{dt}\right) = \cos j \cdot \text{ctn } s \cdot (\text{shown projection of } 73''\text{—}74'')$$

$$\left(\frac{dz}{dt}\right) = \left(\frac{dx}{dt}\right)_o \frac{\cos j}{\tan s} \frac{\sin t}{\cos (j-t)} \quad (4)$$

The solution of the differential equation in $x$ is $$x = \left(\frac{dx}{dt}\right)_o \cos j \cdot \left[\log_e \tan \tfrac{1}{2}(90°+j) - \log_e \tan \tfrac{1}{2}(90°+j-t)\right] \quad (5)$$

as can be verified by differentiation.

The solution of the differential equation $z$ is $$z = \left(\frac{dx}{dt}\right)_o \frac{\cos^2 j}{\tan s} \cdot \left[\text{arc } t \cdot \tan j + \log_e \frac{\cos j}{\cos (j-t)}\right] \quad (6)$$

$x$ and $z$ are measured from the central position, which corresponds to $t=0$. $z$ is in a direction opposite to the lead displacement along axis 26. The total displacement $z_t$ of lead motion and added axial motion is then $$z_t = r \operatorname{ctn} s \operatorname{arc} t - z$$

$$= r \operatorname{ctn} s \left[ \operatorname{arc} t \left\{ 1 - \left(\frac{dx}{dt}\right)_o \frac{\sin j \cos j}{r} \right\} - \left(\frac{dx}{dt}\right)_o \frac{\cos^2 j}{r} \log_e \frac{\cos j}{\cos (j-t)} \right] \quad (7)$$

$z_t$ defines the desired helical motion of varying lead exactly in all its phases. $x$ defines the radial motion in the direction of line 36, to achieve the desired constant relief angles at all stages of the tool life.

With the Equations 5 and 7 in $x$ and $z_t$ appear somewhat complex, their derivatives are very simple. Their first derivatives are given by Equations 3 and 4. By differentiation the second derivatives are obtained as follows:

$$\left(\frac{d^2x}{dt^2}\right) = -\left(\frac{dx}{dt}\right) \tan (j-t)$$

$$\left(\frac{d^2z}{dt^2}\right) = \operatorname{ctn} s \left(\frac{dx}{dt}\right)_o \left[\frac{\cos j}{\cos (j-t)}\right]^2$$

And for the central position, $t=0$:

$$\left(\frac{d^2x}{dt^2}\right)_o = -\left(\frac{dx}{dt}\right)_o \tan j$$

$$\left(\frac{d^2z}{dt^2}\right)_o = \left(\frac{dx}{dt}\right)_o \operatorname{ctn} s$$

The derivatives are useful for obtaining approximations of the surfaces, if desired. The second derivatives at the central position permit to determine surfaces which have the same curvature in all directions as the exact surface, at the mean points 37, 38.

Instead of considering points 37, 38 of the pitch surface, point 64 may be located on the pitch surface. Or any other location may be used.

Production

Figure 6:
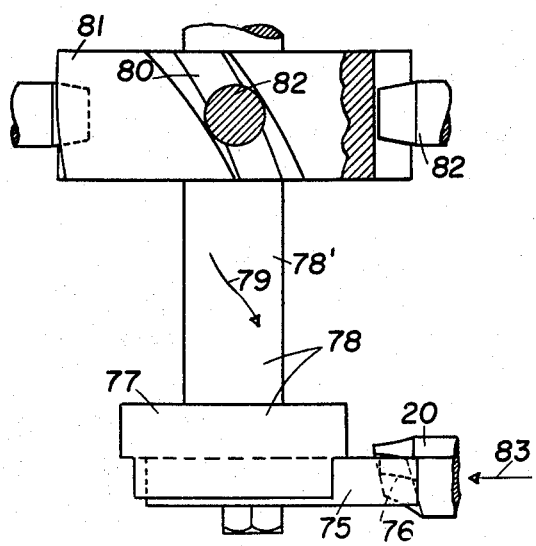
Fig. 6 is a diagrammatic side view taken at right angles to the axis of the helical cutting path, showing a way of cutting a relieved side surface of a tool, and defining the shape of said side surface.

Fig. 6 diagrammatically illustrates one way of relieving a form-tool 20 constructed according to the invention. A relieving tool 75 with side-cutting edge 76 is rigidly secured to the head 77 of a member 78. Member 78 is mounted for turning motion about the axis of its shaft portion 78′ and for reciprocation along said axis. This axis coincides with the axis 26 of the helical cutting motion of the completed tool relatively to a work piece.

A plurality of cam tracks 80 are provided on an enlarged cylindrical portion 81 of member 78. These tracks are curved lengthwise. They are engaged by stationary abutments 82, which could be embodied as rollers if desired. The several tracks and abutments are provided to increase wear resistance. A single track and abutment is also possible.

Member 78 is reciprocated axially of shaft portion 78′ by means not shown, and the cylindrical portion 81 thereby moves past the stationary abutments 82. These impart a turning motion to member 78 in accordance with the shape of the cam tracks, and in accordance with Equation 7. $z_t$ of that equation is the axial displacement of member 78; $t$ is its turning angle; both $z_t$ and $t$ being measured from the central position. Member 78 then moves along arrow 79 in a helical motion of varying lead.

At the same time a relieving motion in the direction of arrow 83 is imparted to the tool blank 20. With respect to the tool as a whole, this motion is radial of the axis of the cutting motion of the completed tool 20. Its radial displacement $x$ from the middle position is defined by Equation 5.

The tool blank 20 is kept withdrawn from contact with the relieving tool during each return stroke. And it is set in after each cutting pass, until the final feed position is reached, where edge 76 sweeps the entire relief surface.

The motions in the directions of arrows 79 and 83 move the cutting edge 76 from front to rear of the tool blank 20. It is also possible to reverse both motions, to move said cutting edge from the rear to the front of the tool blank.

It should be noted that in the helical motion of varying lead the proportion of the translatory motion to the turning motion of edge 76 decreases from front to rear of the tool blank 20. This causes the guide tracks 80 to be more inclined to the axial direction in their upper parts than in their lower parts (Fig. 6), as the upper parts correspond to the rear of the tool.

This varying helical motion also shows up in the shape of the tool. A relieved side surface of the tool contains a constant profile shape all along its working length. The profiles are identical with the tool cutting edge, and with the cutting edge 76 of the relieving tool, and are angularly displaced relatively to each other about an axis having the same direction as the axis (26) of the helical cutting motion of the completed tool. Furthermore they are translated relatively to each other in the direction of said axis. And the proportion of axial translation to angular displacement varies along the working length of the tool and decreases from front to rear of the tool.

In addition to the axial translation there is also a radial translation corresponding to the motion along arrow 83. This translation $x$ is also at a varying proportion to the angular displacement $t$. It corresponds to Equation 5. This equation and the first derivative, Equation 3, indicate that the proportion of translation $x$ to angular displacement $t$ decreases from front to rear of the tool.

Figure 10:
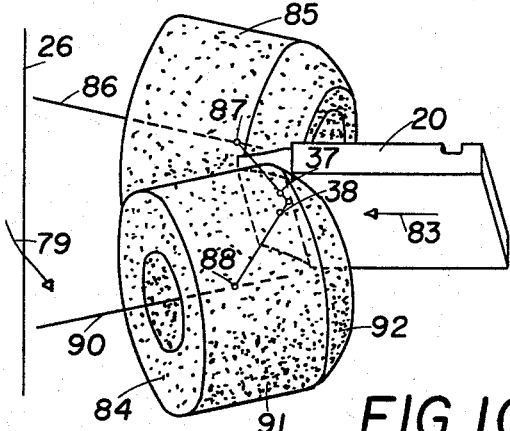
Fig. 10 is a side view similar to Fig. 6, showing a tool in engagement with a pair of grinding wheels, for grinding the relieved side surfaces of said tool.
Figure 11:
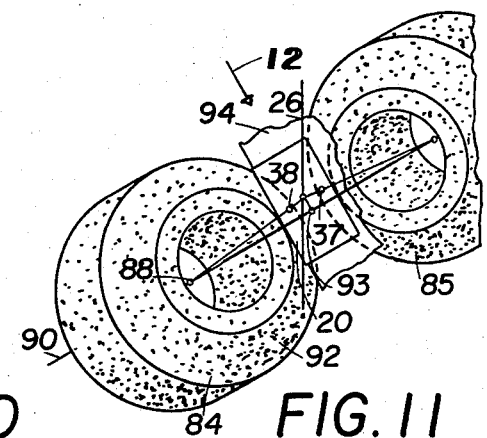
Fig. 11 is a side view corresponding to Fig. 10.
Figure 12:
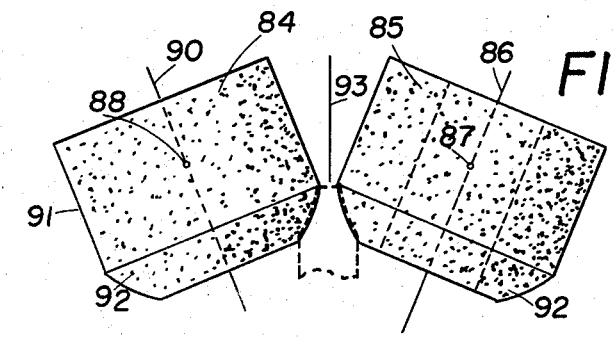
Fig. 12 is a view of the grinding wheels taken in the direction of arrow 12 of Fig. 11.

Figures 10 to 12 illustrate a way of relief-grinding in accordance with the invention. The described shape of the relief surfaces favors grinding because of the constant inclination of the tagent planes. Thus the points 37, 38 remain contact points between the wheels 84, 85 and the work piece 20 in all positions of these mean points, from positions 37′, 38′ to positions 37″, 38″ (Fig. 3).

The surface normals at all points of grinding contact intersect the wheel axis. Thus the normals 37—87, 38—88 intersect the wheel axes 86, 90 at points 87, 88 respectively. The wheels are positioned accordingly.

The motions for relief grinding are the same as for relief cutting. There is the helical motion of varying lead, about axis 26 of the helical cutting motion, along arrow 79. And there is the same radial relieving motion of the tool blank 20 in the direction of arrow 83.

Of course two tools may be used in relief-cutting also.

The wheels 84, 85 are preferably face wheels, having cylindrical outside surfaces 91 and convex working surfaces 92. When such wheels are dressed and trued, their working surface shifts axially, but does not change its diameter. This is an advantage in grinding the above tools, because the resultant shape not only depends on the wheel profile, but on its diameter as well. Face wheels retain their diameter and keep producing the same shape with the same grinding profile.

The axes 86, 90 of the two wheels are preferably arranged at a fixed angle to each other. They constitute a plane. The line 93 bisecting the angle between the two axes may be maintained at right angles to the direction of axis 26, and is then slightly offset from said axis (Fig. 11).

The tool blank 20 is mounted on a holder 94, and suitable guide means and drive means are provided for moving the holder and the grinding wheels as described. The grinding passes may be either from front to rear or from rear to front of the tool blank.

Instead of completely grinding one tool at a time, I may assemble all the identical tools that are to work on a gear blank in a common relieving holder. They may be spaced about the axis of said holder in a way that each of their relief surfaces departs least from a common surface of revolution coaxial with said holder. The holder is indexed between each grinding stroke. The tools are then finished almost simultaneously, and exactly identical tools are obtained without effort.

While I have particularly described symmetrical cutting edges 31, 32, other cutting edges may also be used. Front rake for instance causes the opposite cutting edges to be unsymmetrical. Sometimes I may resort to cutting and grinding one side of a tool blank at a time.

The motions may also be differently split up or arranged. Thus I may impart to the grinding wheels only the translation along axis 26, and mount the tool blank on a table which swings about axis 26. The tool blank performs the radial relieving motion along arrow 93 on said table.

Also approximate methods may be devised to attain relief surfaces based on the disclosed shape. When both sides of the tool blank are to be simultaneously processed it is in all cases important that the angular relative displacement, or the resultant angular relative displacement, is about an axis of the same direction as axis 26 of the helical cutting motion.

It will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A form-cutting tool for cutting a helical tooth surface by relative movement between the tool and a workpiece in a helical path about the axis of the workpiece, said tool having a body portion, a cutting tooth projecting from said body portion, and a side-cutting edge formed at the juncture of the front face of said cutting, said side surface back of said cutting edge containing constant profiles identical with said cutting edge all along the working length of said surface, said profiles back of said cutting edge being angularly displaced relatively to each other about said axis, and being translated relatively to each other along said axis and in a further direction, said axial translation being at a varying proportion to said angular displacement.

2. A form-cutting tool for cutting a helical tooth surface by relative helical movement between the tool and a workpiece about the axis of the workpiece, said tool having a pair of opposite concavely curved form-cutting edges, the side surface of the tool back of each of said cutting edges containing constant profiles identical with the respective cutting edge all along the working length of said side surface, said profiles being angularly displaced relatively to each other about a second axis having the same direction as the axis of the workpiece, and being displaced progressively relatively to each other in the direction of said second axis and in a further direction at right angles thereto, said axial displacement being at a varying proportion to said angular displacement and decreasing from front to rear of said tool as compared with said angular displacement.

3. A form-cutting tool for cutting helical tooth surfaces, said tool having a side-cutting edge formed thereon at the juncture of its front face and a side surface, the side surface back of said cutting edge containing constant profiles identical with said cutting edge all along the working length of said side surface, said profiles being angularly displaced relatively to each other about an axis, and being translated relatively to each other in the direction of said axis and in a further direction angularly disposed thereto, said axial translation being at a varying proportion to said angular displacement, which proportion decreases from front to rear of said tool.

4. A form-cutting tool for cutting helical tooth surfaces, said tool having a side-cutting edge formed thereon at the juncture of its front face and a side surface, the side surface back of said cutting edge containing constant profiles identical with said cutting edge all along the working length of said side surface, said profiles being angularly displaced and translated relatively to each other, the proportion of translation to angular displacement varying along said surface and decreasing from front to rear of said tool.

5. A form-cutting tool for cutting helical tooth surfaces by a relative cutting movement between the tool and a workpiece about and along the axis of the workpiece, said tool having a side-cutting edge, the side surface of said tool back of said cutting edge containing constant profiles identical with said cutting edge all along the working length of said surface, said profiles being angularly displaced relatively to each other about a second axis having the same direction as the axis of the workpiece, and being displaced relatively to each other along said second axis and in a general direction radial of the first-named axis, the last-named displacement being at a varying proportion to said angular displacement, which proportion decreases from front to rear of said tool.

6. A form-cutting tool for cutting helical tooth surfaces, said tool having a pair of opposite, concavely curved side-cutting edges, the side surfaces of said tool back of each of said cutting edges and containing constant profiles identical with the respective cutting edge all along the working length of said side surface, said profiles being angularly displaced relatively to each other about an axis and being translated relatively to each other along said axis and in a direction perpendicular thereto, both said translations being at a varying proportion to said angular displacement, said proportions decreasing from front to rear of said tool.

7. A form-cutting tool for cutting helical tooth surfaces by relative movement between the tool and a rotary workpiece about and along the axis of the workpiece, said tool having a cutting portion and a shank portion, a cutting edge being formed on said cutting portion at the juncture of the front face of said cutting portion and a side surface thereof, said cutting portion back of said edge and containing constant profiles identical with said cutting edge all along the working length of said side surface, said shank portion containing a groove for engagement with a holder, said groove running approximately parallel to said relieved cutting portion.

8. A form-cutting tool for cutting a helical tooth surface, said tool having a body portion, a cutting tooth projecting from said body portion, and a side cutting edge formed at the juncture of the front face of said cutting tooth and one side face thereof, said side face back of said cutting edge containing constant profiles identical with said cutting edge all along the working length of said cutting tooth, said profiles back of said cutting edge being displaced relatively to each other along and angularly about an axis which has the same direction as the axis of the helical tooth surface, and said profiles being displaced from each other, also, in a direction away from said axis.

References Cited in the file of this patent

UNITED STATES PATENTS

| | | |
|---|---|---|
| 2,052,804 | Scott | Sept. 1, 1936 |
| 2,124,126 | Scott | July 19, 1938 |
| 2,348,759 | Sneed | May 6, 1944 |
| 2,374,890 | Pelphrey | May 1, 1945 |
| 2,530,549 | Staples | Nov. 21, 1950 |
| 2,706,420 | Hartman | Apr. 19, 1955 |